US011567811B2

(12) United States Patent
Keating (10) Patent No.: US 11,567,811 B2
(45) Date of Patent: Jan. 31, 2023

(54) DETECTING MULTIPLE OPERATOR PATTERN SERVICES MAKING CONFLICTING RESOURCE MODIFICATIONS

(71) Applicant: Red Hat, Inc., Raleigh, NC (US)

(72) Inventor: Aiden Keating, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 210 days.

(21) Appl. No.: 17/034,220

(22) Filed: Sep. 28, 2020

(65) Prior Publication Data

US 2022/0100585 A1  Mar. 31, 2022

(51) Int. Cl.
*G06F 9/54* (2006.01)
*G06F 9/52* (2006.01)
(Continued)

(52) U.S. Cl.
CPC .............. *G06F 9/52* (2013.01); *G06F 9/5027* (2013.01); *G06F 9/542* (2013.01); *H04L 41/5096* (2013.01)

(58) Field of Classification Search
CPC ...... G06F 1/329; G06F 9/4843; G06F 9/4881; G06F 9/50; G06F 9/5005; G06F 9/5011;
(Continued)

(56) References Cited

U.S. PATENT DOCUMENTS 8,635,618 B2 * 1/2014 Aggarwal ............. G06F 9/4843
 718/107
10,594,582 B2   3/2020 Joshi et al.
(Continued)

FOREIGN PATENT DOCUMENTS

CN    107302604 B    1/2020

OTHER PUBLICATIONS

Dettori, "Simplify the Lifecycle Management Process for your Kubernetes Apps with Operators", IBM, Aug. 1, 2019, 14 pages https://developer.ibm.com/technologies/containers/tutorials/simplify-lifecycle-management-kubernetes-openshift-ibm-cloud-operator/ Simplify the Lifecycle Management Process for your Kubernetes Apps with Operators Aug. 1, 2019 Paolo Dettori, Tim Robinson, Mandana Vaziri IBM.

(Continued)

*Primary Examiner* — Andy Ho
(74) *Attorney, Agent, or Firm* — Lowenstein Sandler LLP (57) ABSTRACT

Systems and methods for detecting multiple operator pattern services making conflicting resource modifications. An example method may comprise receiving, by a processing device, from a first computing process running on a computing platform, a first resource modification request to modify a resource of the computing platform; storing a resource modification record comprising an identification of the first computing process, an identification of the resource, a current state of the resource, and a modified state of the resource; receiving, from a second computing process running on the computing platform, a second resource modification request to modify the resource; determining, using the resource modification record, whether the second resource modification request conflicts with the first resource modification request; and responsive to determining that the second resource modification request conflicts with the first resource modification request, notify a managing process of the computing platform of a resource modification conflict.

20 Claims, 6 Drawing Sheets

(51) Int. Cl.
*G06F 9/50* (2006.01)
*H04L 41/50* (2022.01)

(58) Field of Classification Search
CPC . G06F 9/52; G06F 9/526; G06F 9/528; G06F 9/546
USPC .................................. 718/102, 104; 719/313
See application file for complete search history.

(56) References Cited

U.S. PATENT DOCUMENTS

| | | | |
|---|---|---|---|
| 10,635,648 B2 | 4/2020 | Narayanasamy et al. | |
| 11,038,839 B1* | 6/2021 | Vettaikaran | ............ H04L 61/103 |
| 2015/0067688 A1* | 3/2015 | Nagasawa | ............. G06F 9/4881 |
| | | | 718/102 |
| 2020/0201879 A1 | 6/2020 | Leskes | |
| 2021/0026808 A1* | 1/2021 | Zhao | ..................... G06F 16/134 |
| 2021/0271686 A1* | 9/2021 | Abdul Rasheed | .. G06F 11/1461 |

OTHER PUBLICATIONS

Averdunk, "Build to Manage", Distinguished Engineer, IBM, Dec. 23, 2019, 62 pages https://www.ibm.com/cloud/architecture/files/service-management-pov-csmo-build-to-manage-v1.1.pdf Build to Manage Dec. 23, 2019 Ingo Averdunk, Ana Giordano, Hans Kristian Moen, Carlos Santana, Ratal Szypulka, Julius Wahidin Distinguished Engineer, IBM.

Philips, "Introducing the Operator Framework: Building Apps on Kubernetes", RedHat Inc., May 1, 2018 9 pages https://www.redhat.com/en/blog/introducing-operator-framework-building-apps-kubernetes Introducing the Operator Framework: Building Apps on Kubernetes May 1, 2018 Brandon Philips RedHat Inc.

* cited by examiner

DETECTING MULTIPLE OPERATOR PATTERN SERVICES MAKING CONFLICTING RESOURCE MODIFICATIONS

TECHNICAL FIELD

The implementations of the disclosure generally relate to computer systems and, more specifically, to detecting multiple operator pattern services making conflicting resource modifications.

BACKGROUND

Platform-as-a-Service (PaaS) system offerings can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for detecting multiple operator pattern services making conflicting resource modifications. A containerized computing services platform may implement a Platform-as-a-Service (PaaS) system, such as OpenShift® or Kubernetes®. The PaaS system provides resources and services (e.g., micro-services) for the development and execution of applications owned or managed by multiple users. A PaaS system provides a platform and environment that allow users to build applications and services in a clustered compute environment (the "cloud"). PaaS system offerings include services that use operating system (OS) level virtualization to deliver software in packages called containers. A container is a standard unit of software that packages code, libraries and configuration files so the application can run from one computing environment to another. Containers may be deployed and run distributed applications without launching an entire virtual machine for each application. Programs running inside a container can only see the container's contents and devices assigned to the container. Containers may communicate with each other through one or more channels, and may be run by a single OS kernel, allowing for use of fewer resources than virtual machines.

PaaS system offerings may further provide software extensions, called operator pattern services, which may manage applications and associated resources. In particular, an operator pattern service is software that is used to provision and manage a defined state of an application using user-defined logic to regulate said defined state (e.g., reconciliation event). The operator pattern service may operate in a control loop managed by a controller service. The control loop is an indefinite sequence of executed reconciliation events that are separated by a control loop delay. The control loop delay is a unit of time between the completion of one reconciliation event and the execution of a subsequent reconciliation event. Examples of operator pattern services include taking and restoring backups of an application's state, allocating memory (e.g., RAM) to a container, executing updates, etc.

Each operator pattern service may implement a different framework (e.g., software based on a specific technology or programming language), and two operating pattern services with different frameworks may not be interoperable. As such, when multiple operator pattern services operate upon the same resources (e.g., network interface, memory, CPU, huge pages, pods, service resources, etc.), each operator pattern service, in their respective control loops, may over-write changes made to the resource by another operator pattern service. Since all control loops regulate a consistent state in their resources, this results in a resource being modified back and forth as the two control loops attempt to regulate their conflicting states. For example, two operator pattern services may attempt to configure a network interface on a container that hosts a website. In particular, the first operator pattern service may modify a container to run a website on port 80, while the second operator pattern service may modify the container to run the website on port 8080. The control loops of the first operator pattern service and the second operator pattern service may continuously modify the container and switch between port 80 and port 8080. To outside observers, the website may appear as non-responsive.

Detecting these scenarios is difficult because each operator pattern service has a different framework and no knowledge of other operator pattern services attempting to modify the same resources.

Aspects of the present disclosure address the above noted and other deficiencies by implementing a system capable of detecting multiple operator pattern services making conflicting modifications to the same resource. In particular, the present system may detect a modification from an operator pattern service to a resource associated with the containerized computing services platform. Responsive to the detection, the present system may register the modification in a database. Each resource modification may be registered as a function of the identification of the operator pattern service, the identification of the resource, and one or more parameters (e.g., values related to a modifiable property) of the resource. Resources may have many parameters (e.g., a network interface may have configurable network address, subnet mask, default gateway, etc.), that may be modified. For example, the modification may be registered as a resource modification record related to the identification of the operator pattern service, the identification of the modified resource, the state of the resource prior to being modified, and the state of the resource post modification. The database may be queried by the operator pattern services, by users, or by managing processes (e.g., node managers, cluster managers, etc.) of the cloud-based PaaS system. In an example, prior to making a modification to a resource or responsive to a modification to the resource, an operator pattern service may query the database to determine whether another operator pattern service is currently modifying the resource. In another example, a user may query the database. Querying the database allows for the discovery of whether multiple operator pattern services are making conflicting modifications to a resource or to the parameters of a resource. Based on the query, a notification or corrective action may be triggered. For example, the present system may notify a managing process of the computing platform of a resource modification conflict with respect to the resource.

Figure 1:
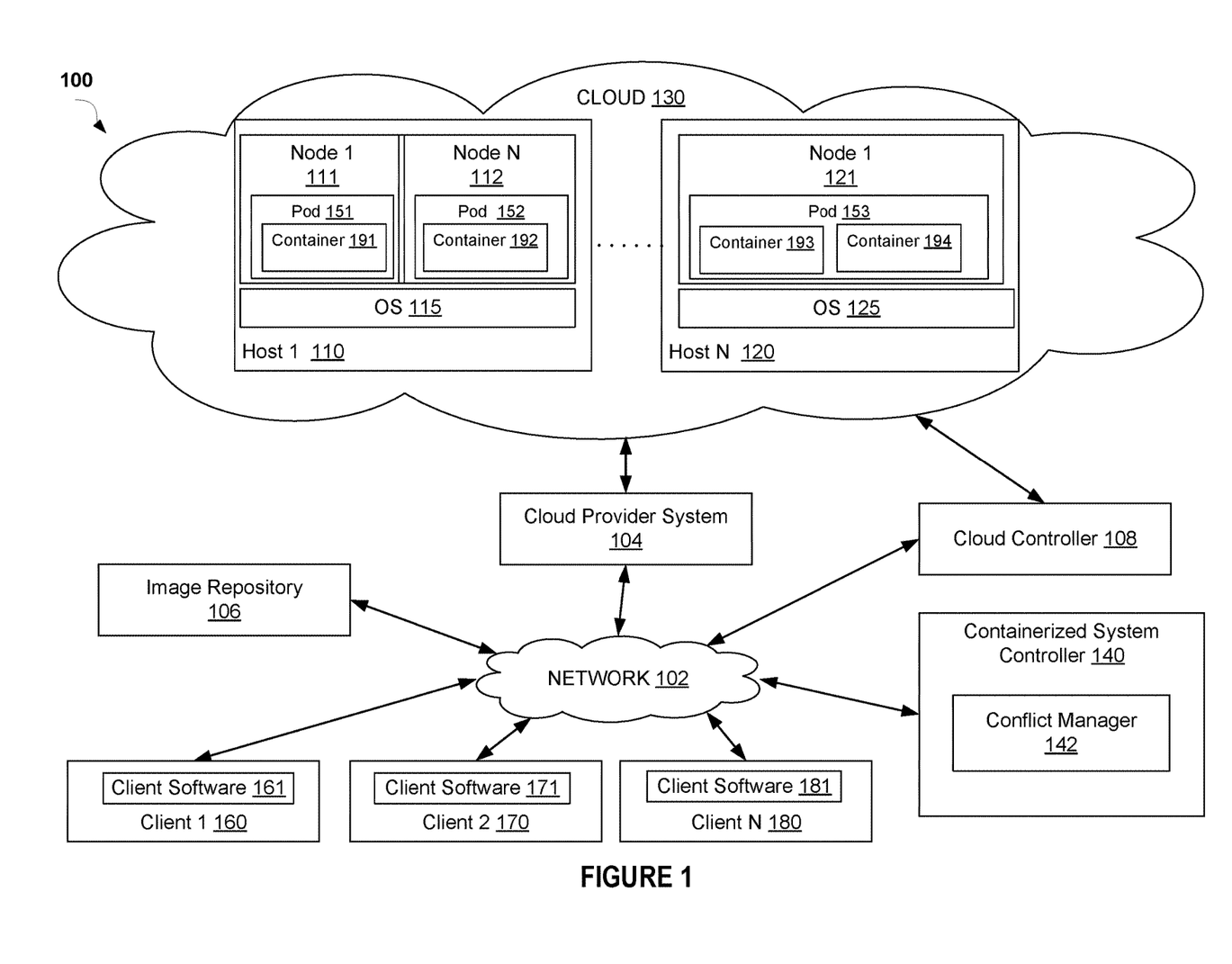
FIG. 1 depicts a high-level component diagram of an example computer system architecture, in accordance with one or more aspects of the present disclosure.

FIG. 1 is a block diagram of a network architecture 100 in which implementations of the disclosure may operate. In some implementations, the network architecture 100 may be used in a containerized computing services platform. As discussed above, a containerized computing services platform may include a Platform-as-a-Service (PaaS) system, such as OpenShift® or Kubernetes®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In various implementations, developers, owners, and/or system administrators of the applications may maintain applications executing in cloud 130 by providing software development services, system administration services, or other related types of configuration services for associated nodes in cloud 130. This can be accomplished by accessing cloud 130 using an application programmer interface (API) within the applicable cloud service provider system 104. In some implementations, a developer, owner, or system administrator may access the cloud service provider system 104 from a client device (e.g., clients 160, 170, and 180) that includes dedicated software to interact with various cloud components. Additionally, or alternatively, the cloud service provider system 104 may be accessed using a web-based or cloud-based application that executes on a separate computing device that communicates with a client device via network 102.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from containerized system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a containerized computing services platform managed by the containerized system controller 140.

In one implementation, the data is used for execution of containers 191, 192, 193, 194 in one or more pods 151, 152, 153. The pods 151, 152, 153 are a group of one or more containers that are deployed together on the same node 111, 112, 121, and are the smallest compute unit that can be defined, deployed, and managed in the containerized computing service environment. Each pod 151, 152, 153 is allocated its own internal IP address, with containers 191, 192, 193, 194 within pods 151, 152, 153 being able to share local storage and networking. Pods 151, 152, 153 have a lifecycle that is defined and can run on a node 111, 112, 121 until the pod's containers exit or they are removed for some other reason.

The containers 191, 192, 193, 194 can include application images built from pre-existing application components and source code of users managing the application. An image may refer to data representing executables and files of the application used to deploy functionality for a runtime instance of the application. In one implementation, the image can be built using a Docker™ tool and is referred to as a Docker image. In other implementations, the application images can be built using other types of containerization technologies. An image build system (not pictured) can generate an application image for an application by combining a preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

In various implementations, a container 191, 192, 193, 194 can be a secure process space on the nodes 111, 112, 121 to execute functionality of an application. In some implementations, a container 191, 192, 193, 194 is established at the nodes 111, 112, 121 and 122 with access to certain resources of the underlying node, including memory and storage. In one implementation, the containers 191, 192, 193, 194 may be established using the Linux Containers (LXC) method. In further implementations, containers 191, 192, 193, 194 may also be established using cgroups, SELinux™, and kernel namespaces, to name a few examples.

In some implementations, the containerized system controller 140 may include a conflict manager 142 that implements conflict management for the cloud-based PaaS system described above. Conflict manager 142 may detect a modification from a computing process, such as an operator pattern service, to a resource associated with the containerized computing services platform. Resources may include primary resources and secondary sources. A secondary resource is a resource containing arbitrary metadata (e.g., key/value maps such as labels, annotations, etc.), upon which a control loop reads, modifies, or deletes. A primary resource is a secondary resource that a control loop acts upon. For example, the control loop reacts to the state of a primary resource and uses the arbitrary metadata to regulate the secondary resource(s) or service(s). A primary resource in one controller (a process that continuously invokes a control loop) may be a secondary resource in another controller.

Responsive to detecting a modification conflict manager 142 may register the modification in volatile memory or non-volatile memory (e.g., in a database, as a file, etc.). In some embodiments, each resource modification may be registered as a function of the identification of the operator pattern service, the identification of the modified resource, the state of the resource prior to being modified, and the state of the resource post modification. For example, a resource modification may be registered as a resource modification record by determining a difference between the current state of the resource and the modified state of the resource, converting the difference to a list of deterministic values that represent each element of the difference, and mapping the list of deterministic values to the identification of the resource and the identification of the first computing process. Accordingly, each modification performed by each operator pattern service to each resource may be registered in the database. The database may be queried by the operator pattern services, by users, or by any other component of the cloud-based PaaS system. Querying the database allow for the discovery of which resources have multiple operator pattern services modifying which parameters (e.g., values) of the resources, and which resources are subject to conflicting modifications by multiple operator pattern services.

While aspects of the present disclosure describe the conflict manager 142 as implemented in a PaaS environment, it should be noted that in other implementations, the conflict manager 142 can also be implemented in an Infrastructure-as-a-Service (Iaas) environment, such as Red Hat OpenStack®. Additionally, while for simplicity of illustration, FIG. 1 depicts a single cloud 130, aspects of the present disclosure can be implemented to manage conflicts across multiple clouds 130. In such instances the conflict manager 142 may manage conflicts for hybrid cloud environments, multi-cluster cloud environments, or the like. Conflict manager 142 is described in further detail below with respect to FIG. 2.

Figure 2:
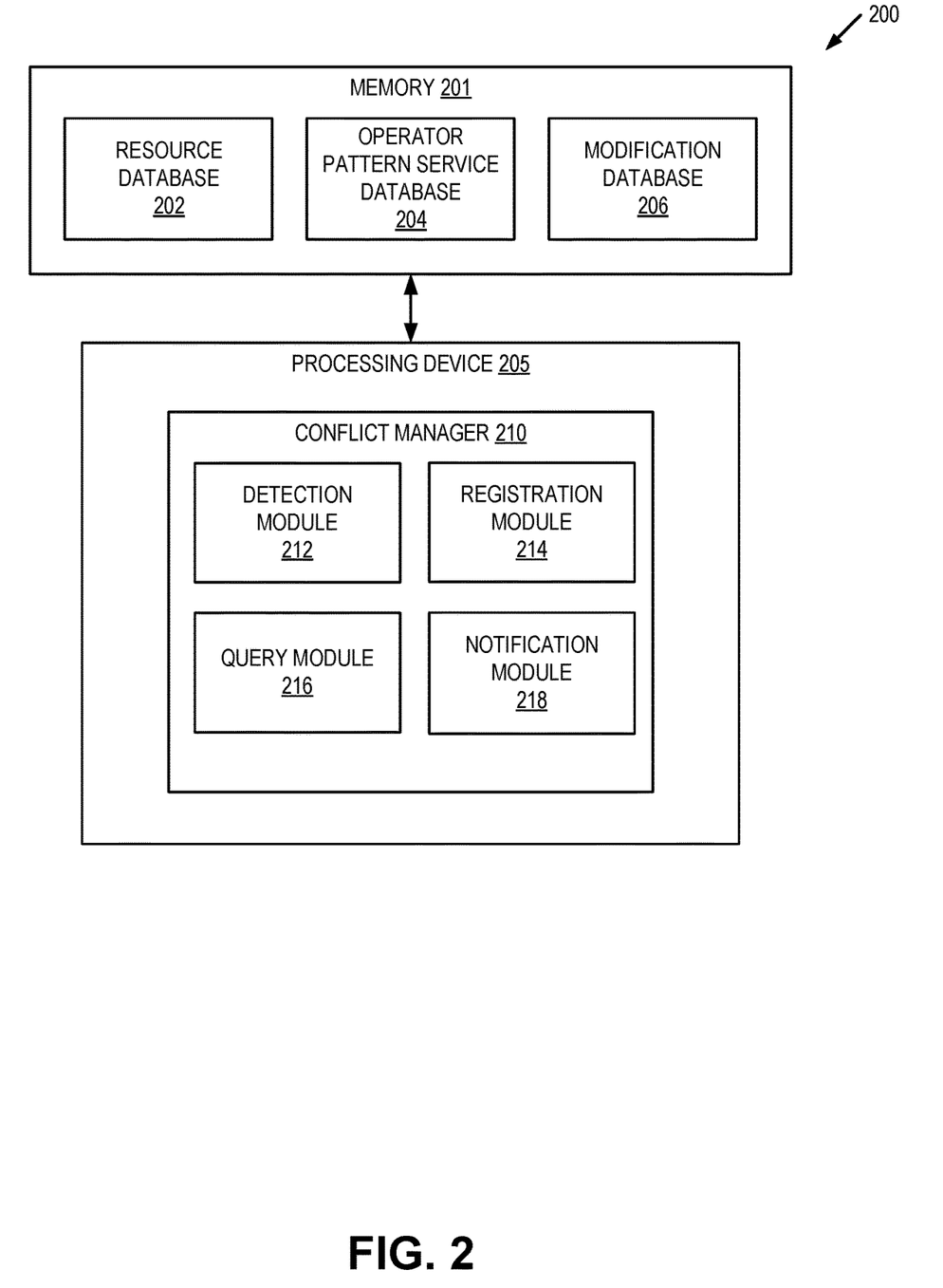
FIG. 2 depicts a block diagram illustrating an example of a conflict manager, in accordance with one or more aspects of the present disclosure.

FIG. 2 depicts a block diagram illustrating an example of conflict manager 210 for facilitating conflict management for cloud computing services of a cloud computing environment. In some implementations, conflict manager 210 may correspond to conflict manager 142 of FIG. 1. As shown in FIG. 2, conflict manager 210 may be a component of a computing apparatus 200 that includes a processing device 205, operatively coupled to a memory 201, to execute operator manager 210. In some implementations, processing device 205 and memory 201 may correspond to processing device 602 and main memory 604 respectively as described below with respect to FIG. 6.

Memory 201 may include a resource database 202, an operation pattern service database 204, and a modifications database 206. Resource database 202 may store data associated with resources and their modifiable parameters as related to the cloud computing environment. Resources may have many parameters (e.g., a network interface may have configurable network address, subnet mask, default gateway, etc.), that may be modified. For example, the resource may include resource identification data, resource property data, resource functions data, resource address data, resource parameter data, resource status data, etc. The resources may include, but are not limited to, CPU resources, memory resources, input/output (I/O) resources, network resources, node resources, pod resources, container resources, or any other hardware or software based resources associated with any components of the cloud computing environment. The operator pattern service database 204 may store data associated with operator patterns services (e.g., operator pattern service identifications, associated containers, functions, etc.). The modifications database 206 may store data associated with modifications performed on resources. In some embodiments, one or more of resource database 202, operator pattern database 204, and modifications database 206 may be structured in a data interchange format, such as but not limited to, (e.g., JavaScript Object Notation (JSON), YAML Ain't Markup Language (YAML)), etc. In other embodiments, one or more of resource data base 202, operation pattern service database 204, and modification database 206 may be structured in a format other than a data interchange format.

Conflict manager 210 may include detection module 212, registration module 214, query module 216, and notification module 218. Alternatively, the functionality of one or more of detection module 212, registration module 214, query module 216, and notification module 218 may be combined into a single module or divided into multiple sub-modules.

Detection module 212 may detect modifications requested (e.g., a resource modification request) or performed by computing processes, such as an operator pattern services, to resources associated with the cloud computing environment. As noted above, in some implementations, the cloud computing environment may be a containerized environment, where nodes can include pods, and where each pod can include one or more containers that can be used to execute applications within the environment. Cloud computing environments configured in such a manner can be an OpenShift based environment, a Kubernetes based environment, or the like.

Registration module 214 may register resources associated with cloud computing services, operator pattern services provided by the cloud computing services, and each resource modification associated with the containerized environment. In some implementations, registration module 214 may store resource data in resource database 202. For example, registration module 214 may perform a serialization operation and translate the resource data into a data interchange format, where the resource data is defined as an attribute-value pair (also known as a name-value pair, a key-value pair, or a field-value pair) or any other serializable value. In some implementations, each resource entry (serialized value) in resource database 202 may include a unique identifier of the resource and a current state of the resource. For example, for a container hosting a website on port 80, the serialized value may include a unique identifier associated with the container networking port, and the current status or state of the container networking port (e.g., assigned to port 80). The serialized value (e.g., attribute-value pair) may be deterministic and not based on any external variables, such as the current time.

In some implementations, registration module 214 may register operator pattern service data in the operator pattern service database. In some implementations, responsive to detecting an operator pattern service loaded, operating, performing a function, etc., registration module 214 may register data associated with said operator pattern service in operator pattern service database 204. In some implementations, registration module 214 perform a serialization operation and translate the operator pattern service data into a data interchange format. In other implementations, the operator pattern service data may be stored in a different format. Each operator pattern service entry in operator pattern service database 204 may include a unique identifier.

In some implementations, registration module 214 may register an entry in the modifications databased 206 associated with each detected modification. Each entry may be registered as a function of one or more parameters associated with the operator pattern service requesting the modification, the resource modified, and/or one or more statuses of the resource. For example, the modification may be registered as a serialized value associated with the identification of the operator pattern service, the identification of the modified resource, the serialized state of the resource prior to being modified, and the serialized state of the resource post modification.

In an illustrative example where an operator pattern service requests modification of a networking port on a container (currently hosting a website on port 80) to port 8080, the registration module 214 may determine or receive as input the identification of the operator pattern service, determine or receive as input the identification of the resource, determine or receive as input the serialized current state of the resource (e.g., assigned to port 80), and determine or receive as input the serialized modified state of the resource (e.g., assigned to port 8080). The registration module 214 may then determine a difference between the serialized current state of the resource and the serialized modified state of the resource. The difference may be converted to a list of deterministic values that represent each element of the difference. The registration module 214 may then map the list of deterministic values to the identification of the resource and the identification of the operator pattern service. The mapping(s) may be stored in modification database 206. In other implementations, other registration methods may be used by the registration module 214. Each modification performed by each operator pattern service to each resource may be registered in modifications database 206.

Query module 216 may enable conflict manager 210, an operator pattern service, a user, or any other component of the cloud-based PaaS system to query modifications database 206. In an example, responsive to detection module 212 detecting a modification requested or performed by an operator pattern service, query module 216 may query modifications database 206 to determine whether another operator pattern service is currently regulating a resource associated with the detected modification. In another example, prior to making a modification to a resource, an operator pattern service may enable query module 216 to query modifications database 206 to determine whether another operator pattern service is currently regulating a resource. In yet another example, a user may query database 206. For example, prior to running a new operator pattern service, the user may query modification database 206 (via query module 216) to determine whether the new operator pattern service will conflict with an existing operator pattern service. Querying database 206 allows for the discovery of whether multiple operator pattern services are making conflicting modifications to a resource or to parameters of a resource.

Notification module 218 may trigger generating a notification or a corrective action in response to detecting two operator pattern services making conflicting modifications. For example, the notification module 218 may perform periodic queries of the modification database 206 and, upon detection of conflicting modifications, generate an alert to the associated operator pattern service(s), to the user, or may notify a managing process of the computing platform of a resource modification conflict with respect to the resource.

In some implementations, notification module 218 may determine whether a time period between the two or more resource modification requests initiated from two different operator pattern services is less than a predetermined threshold value. Responsive to the time period being less than the predetermined threshold value, notification module 218 may trigger generating the notification. This may indicate that two operator pattern services are continuously making conflicting modifications to the same resource.

Figure 3:
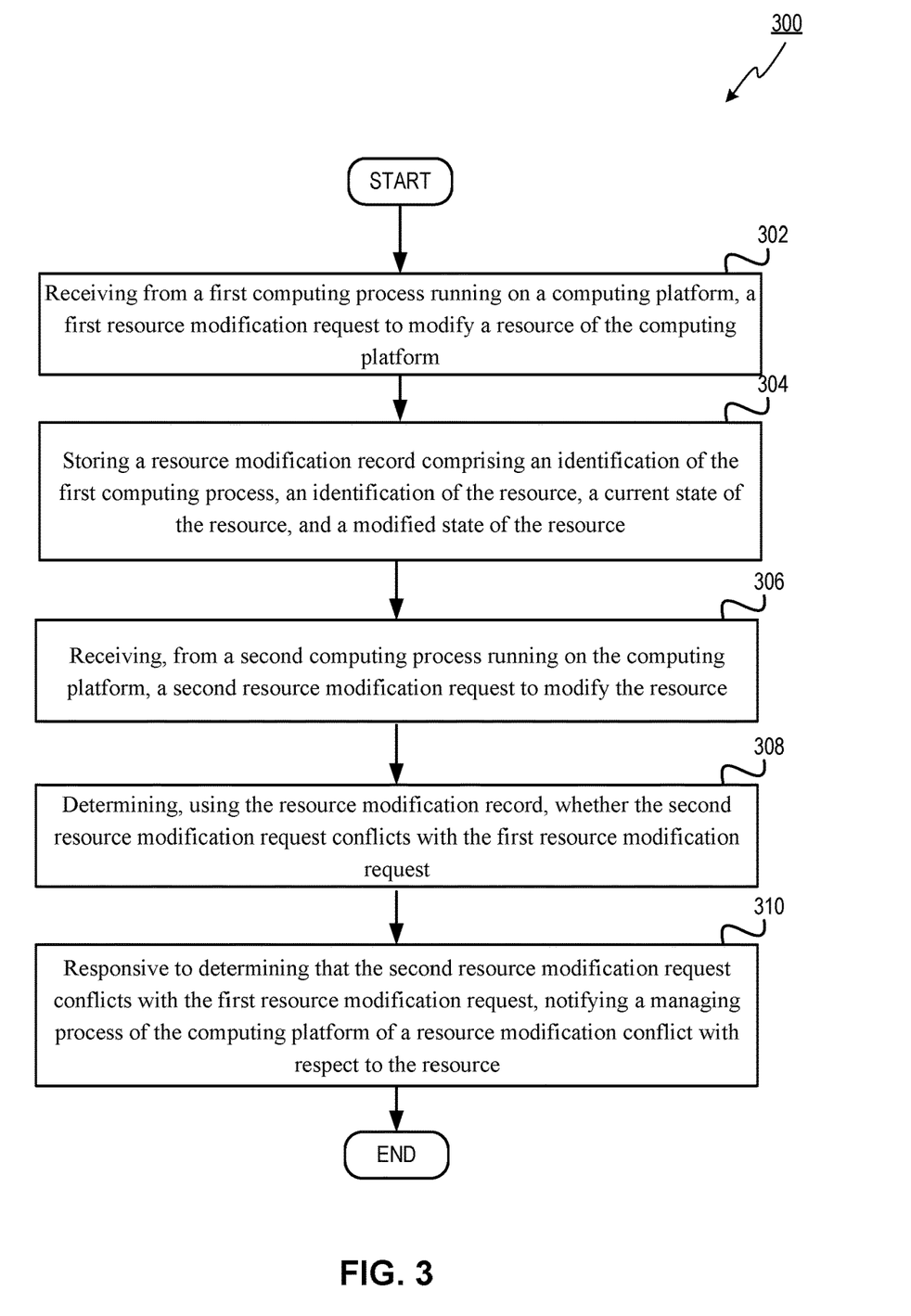
FIG. 3 depicts a flow diagram of a method for facilitating conflict management for cloud computing services, in accordance with one or more aspects of the present disclosure.

FIG. 3 depicts a flow diagram of an illustrative example of a method 300 for facilitating conflict management for cloud computing services, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel or by executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, the server or client device may receive, from a first computing process running on a computing platform, a first resource modification request to modify a resource of the computing platform. The first computing process may include an operator pattern service. The first computing process may operate in a control loop. The first resource modification request may specify the resource identification of the resource requested to modify. The computing platform may include a containerized computing services platform (e.g., a Kubernetes cluster) running one or more containers, a host machine running one or more virtual machines, etc.

At block 304, the server or client device may store, in a memory, a resource modification record including one or more of an identification of the first computing process, an identification of the resource, a current state of the resource, and a modified state of the resource. In an example, the server or client device may generate the resource modification record by determining a difference between the current state of the resource and the modified state of the resource, converting the difference to a list of deterministic values that represent one or more elements of the difference, and mapping the list of deterministic values to the identification of the resource and the identification of the first computing process. The memory include a database. The resource modification record may include an attribute-value pair.

At block 306, the server or client device may receive, from a second computing process running on the computing platform, a second resource modification request to modify the resource. The second resource modification request may specify the resource identification. Thus, the server or client may determine that the second resource modification request is made to the same resource. The second computing process may be another operator pattern service. The second computing process may also operate in a control loop.

At block 308, the server or client device may determine, using the resource modification record, whether the second resource modification request conflicts with the first resource modification request. For example, the server or client may determine whether the second resource modification request is modifying the same resource as the first resource modification request.

At block 310, responsive to determining that the second resource modification request conflicts with the first modification request, the server or client device may generate a notification. For example, the server or client device may notify a managing process of the computing platform of a resource modification conflict with respect to the resource. The managing process may implement a node manager, a cluster manager, etc. In some implementations, the server or client device may perform a periodic query of the database to determine whether multiple computing process are making conflicting modifications to a resource.

In some implementations, the client or server may first determine whether a determining a time period between the first resource modification request and the second resource modification request (or between the first resource modification request and the third resource modification request, or between the second resource modification request and the third resource modification request) is less than a predetermined threshold value. Responsive to the time period being less than the predetermined threshold value (and responsive to determining that the resource modification requests conflict with each other) the client or server may trigger generating the notification. If the time period is equal or more than the predetermined threshold value, no notification may be generated, regardless of whether the resource modification requests conflict with each other. Responsive to completing the operations described herein above with references to block 310, the method may terminate.

Figure 4:
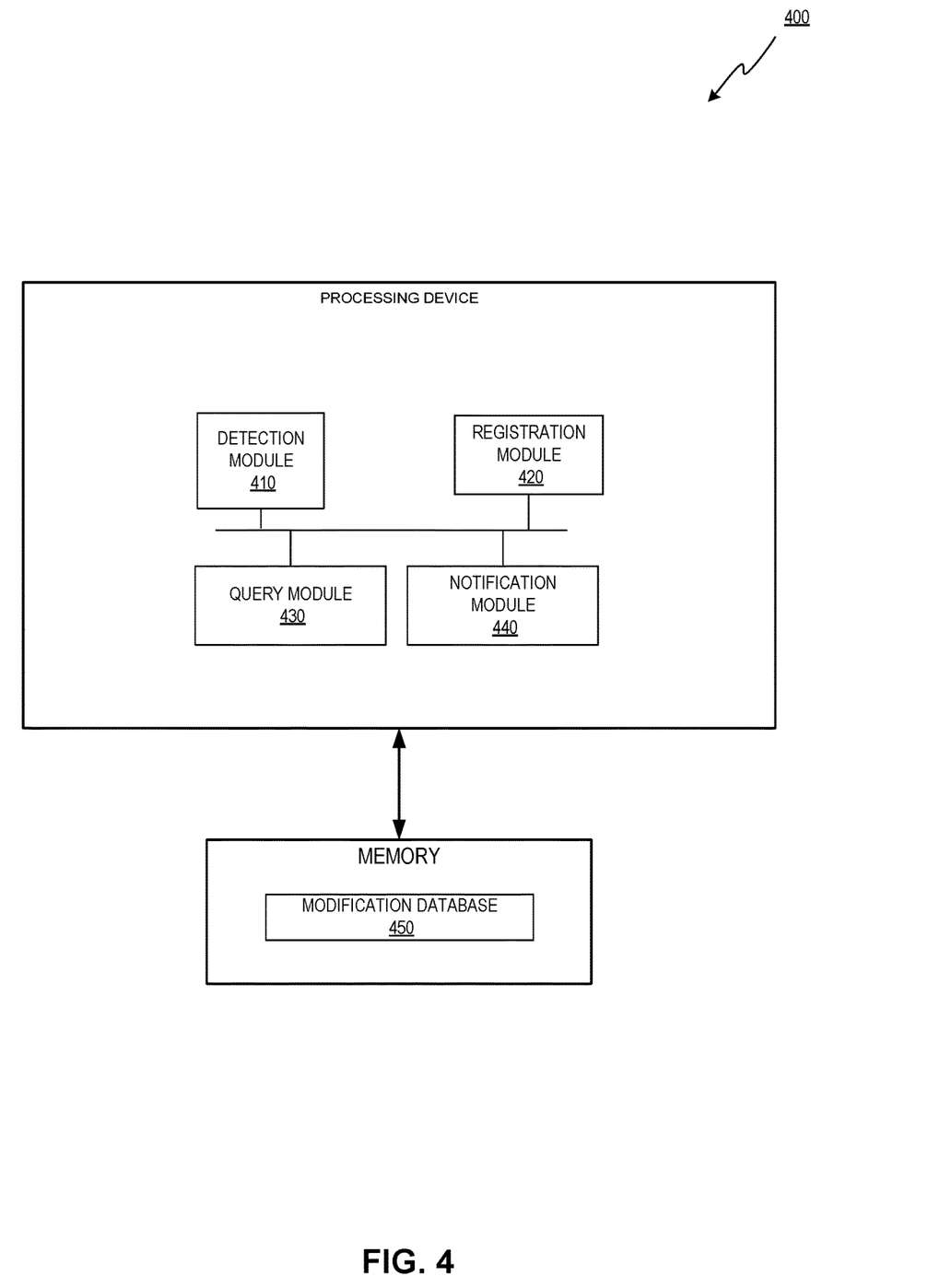
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing device 100 and may include one or more processing devices and one or more memory devices. In the example shown, computer system 500 may include detection module 410, registration module 420, query module 430, notification 440, and modification database 450.

Detection module 410 may receive, from a first computing process running on a computing platform, a first resource modification request to modify a resource of the computing platform. The first computing process may include an operator pattern service. The first computing process may operate in a control loop. The first resource modification request may specify the resource identification of the resource requested to modify. The computing platform may include a containerized computing services platform (e.g., a Kubernetes cluster) running one or more containers, a host machine running one or more virtual machines, etc.

Registration module 420 may store, in a memory including modification database 450, a resource modification record including one or more of an identification of the first computing process, an identification of the resource, a current state of the resource, and a modified state of the resource. In an example, registration module 420 may generate the resource modification record by determining a difference between the current state of the resource and the modified state of the resource, converting the difference to a list of deterministic values that represent one or more elements of the difference, and mapping the list of deterministic values to the identification of the resource and the identification of the first computing process. The resource modification record may include an attribute-value pair.

Detection module 410 may then receive, from a second computing process running on the computing platform, a second resource modification request to modify the resource. The second resource modification request may specify the resource identification. Thus, detection module 410 may determine that the second resource modification request is made to the same resource. The second computing process may be another operator pattern service. The second computing process may also operate in a control loop.

Query module 430 may determine, using the resource modification record, whether the second resource modification request conflicts with the first resource modification request. For example, query module 430 may determine whether the second resource modification request is modifying the same resource as the first resource modification request.

Responsive to determining that the second resource modification request conflicts with the first modification request, notification module 440 may generate a notification. For example, the notification module 440 may notify a managing process of the computing platform of a resource modification conflict with respect to the resource. The managing process may implement a node manager, a cluster manager, etc. In some implementations, the server or client device may perform a periodic query of the database to determine whether multiple computing process are making conflicting modifications to a resource.

In some implementations, notification module 440 may first determine whether a determining a time period between the first resource modification request and the second resource modification request (or between the first resource modification request and the third resource modification request, or between the second resource modification request and the third resource modification request) is less than a predetermined threshold value. Responsive to the time period being less than the predetermined threshold value (and responsive to determining that the resource modification requests conflict with each other) notification module 440 may trigger generating the notification. If the time period is equal or more than the predetermined threshold value, no notification may be generated, regardless of whether the resource modification requests conflict with each other.

Figure 5:
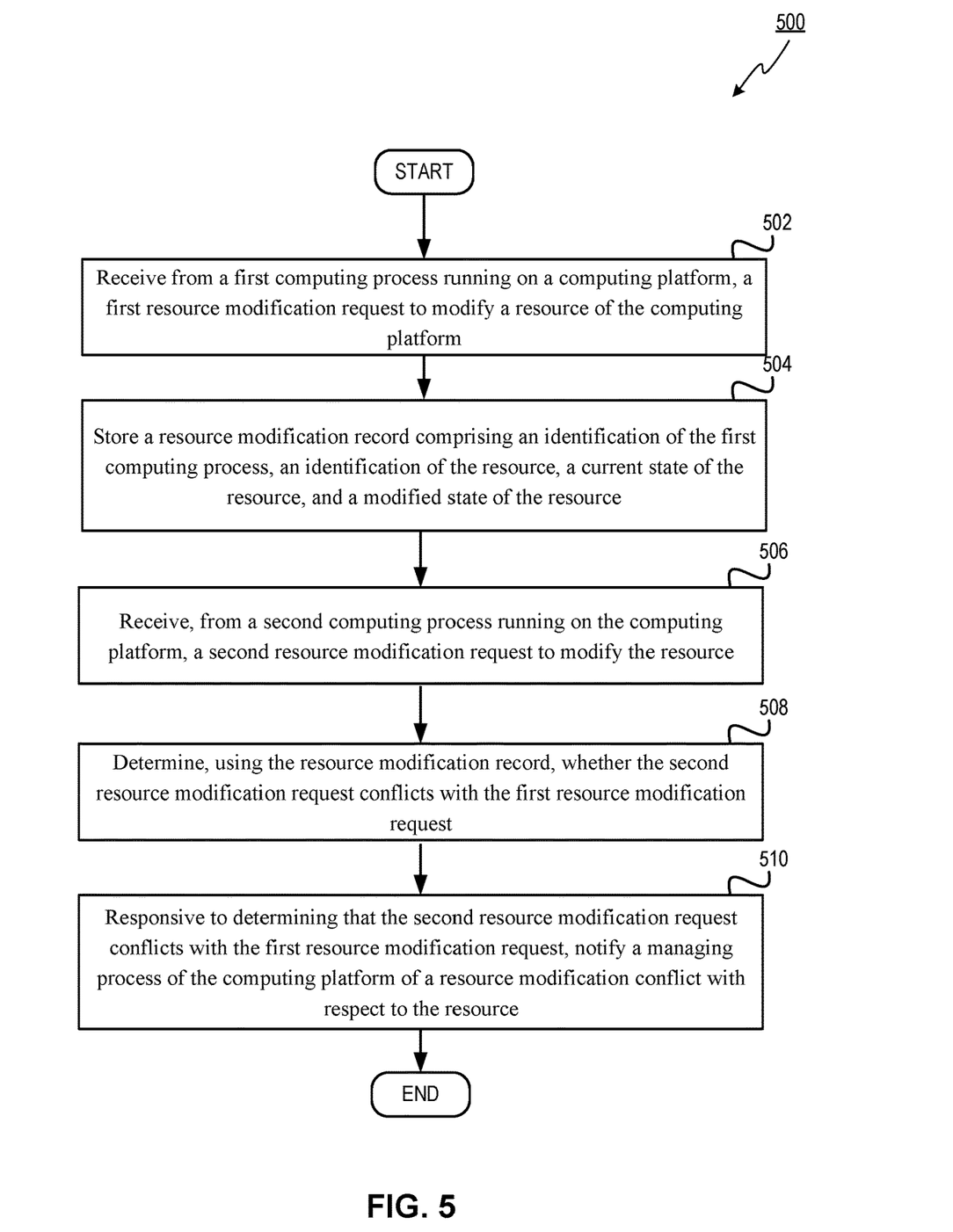
FIG. 5 depicts a flow diagram of a method for facilitating conflict management for cloud computing services, in accordance with one or more aspects of the present disclosure.

FIG. 5 depicts a flow diagram of one illustrative example of a method 500 for facilitating conflict management for cloud computing services, in accordance with one or more aspects of the present disclosure. Method 500 may be similar to method 300 and may be performed in the same or a similar manner as described above in regards to method 300. Method 500 may be performed by processing logic of a server device or a client device and may begin at block 502.

At block 502, a processing logic may receive, from a first computing process running on a computing platform, a first resource modification request to modify a resource of the computing platform. The first computing process may include an operator pattern service. The first computing process may operate in a control loop. The first resource modification request may specify the resource identification of the resource requested to modify. The computing platform may include a containerized computing services platform (e.g., a Kubernetes cluster) running one or more containers, a host machine running one or more virtual machines, etc.

At block 504, the processing logic may store, in a memory, a resource modification record including one or more of an identification of the first computing process, an identification of the resource, a current state of the resource, and a modified state of the resource. In an example, the processing logic may generate the resource modification record by determining a difference between the current state of the resource and the modified state of the resource, converting the difference to a list of deterministic values that represent one or more elements of the difference, and mapping the list of deterministic values to the identification of the resource and the identification of the first computing process. The memory include a database. The resource modification record may include an attribute-value pair.

At block 506, the processing logic may receive, from a second computing process running on the computing platform, a second resource modification request to modify the resource. The second resource modification request may specify the resource identification. Thus, the processing logic may determine that the second resource modification request is made to the same resource. The second computing process may be another operator pattern service. The second computing process may also operate in a control loop.

At block 508, may determine, using the resource modification record, whether the second resource modification request conflicts with the first resource modification request. For example, the processing logic may determine whether the second resource modification request is modifying the same resource as the first resource modification request.

At block 510, responsive to determining that the second resource modification request conflicts with the first modification request, the processing logic may generate a notification. For example, the processing logic may notify a managing process of the computing platform of a resource modification conflict with respect to the resource. The managing process may implement a node manager, a cluster manager, etc. In some implementations, the server or client device may perform a periodic query of the database to determine whether multiple computing process are making conflicting modifications to a resource.

Figure 6:
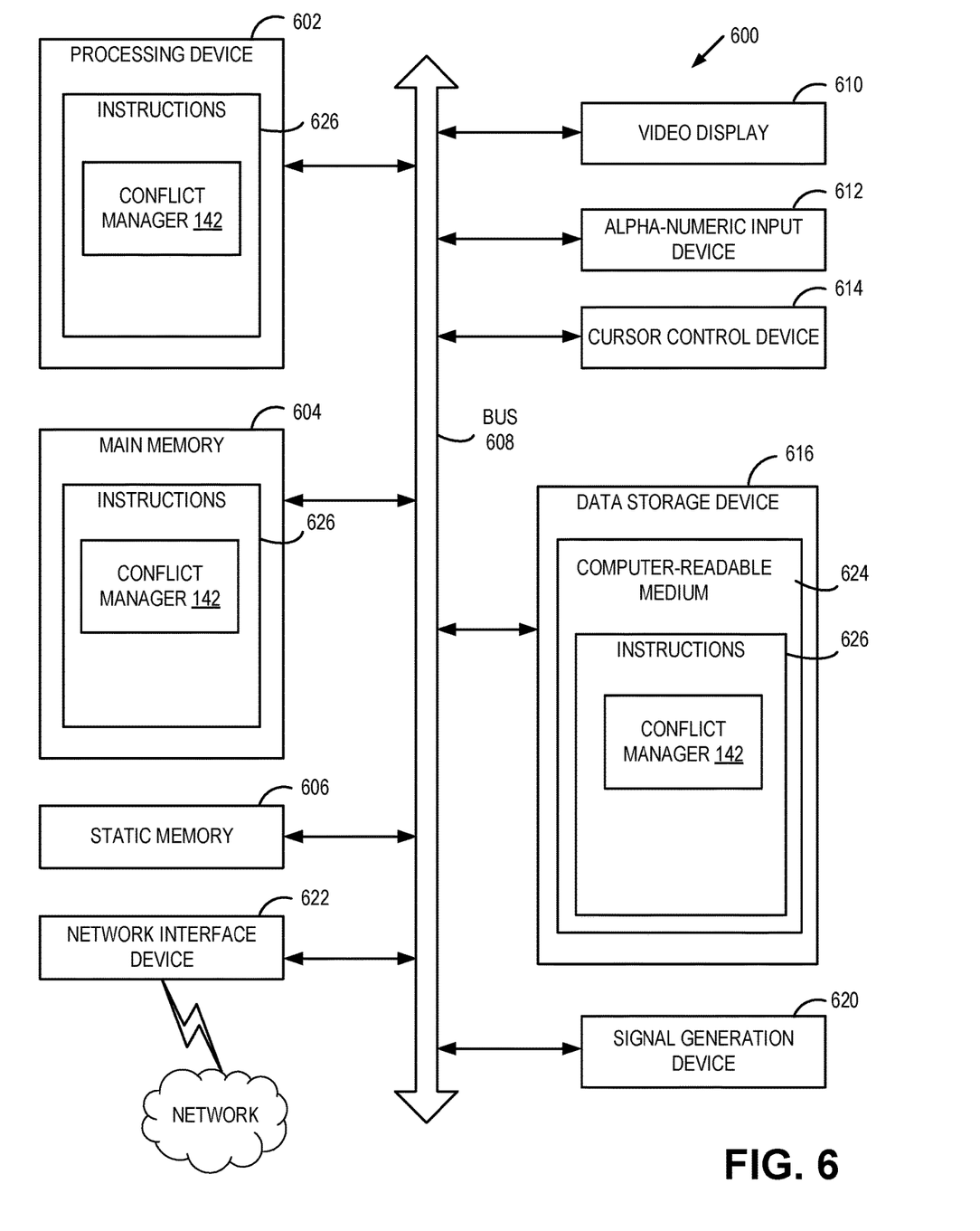
FIG. 6 depicts a block diagram of an illustrative computer system operating in accordance with one or more aspects of the present disclosure.

In some implementations, the processing logic may first determine whether a determining a time period between the first resource modification request and the second resource modification request (or between the first resource modification request and the third resource modification request, or between the second resource modification request and the third resource modification request) is less than a predetermined threshold value. Responsive to the time period being less than the predetermined threshold value (and responsive to determining that the resource modification requests conflict with each other) the processing logic may trigger generating the notification. If the time period is equal or more than the predetermined threshold value, no notification may be generated, regardless of whether the resource modification requests conflict with each other. Responsive to completing the operations described herein above with references to block 510, the method may terminate FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic (e.g., instructions 626) that includes conflict manager 142 for performing the operations and steps discussed herein (e.g., corresponding to the methods of FIGS. 3 and 5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include conflict manager 142 (e.g., corresponding to the method of FIGS. 3 and 5, etc.) embodying any one or more of the methodologies or functions described herein. Conflict manager 142 may also reside, completely or at least partially, within the main memory 604 and/or within the processing device 602 during execution thereof by the computer system 600, the main memory 604 and the processing device 602 also constituting computer-readable media. Conflict manager 142 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "executing," "rejecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, from a first computing process running on a computing platform, a first resource modification request to modify a resource of the computing platform;
   storing, in a memory, a resource modification record comprising an identification of the first computing process, an identification of the resource, a current state of the resource, and a modified state of the resource;
   receiving, from a second computing process running on the computing platform, a second resource modification request to modify the resource;
   determining, using the resource modification record, whether the second resource modification request conflicts with the first resource modification request; and
   responsive to determining that the second resource modification request conflicts with the first resource modification request, notifying a managing process of the computing platform of a resource modification conflict with respect to the resource.

2. The method of claim 1, wherein the first computing process implements an operator pattern service.

3. The method of claim 1, further comprising generating resource modification record by determining a difference between the current state of the resource and the modified state of the resource, converting the difference to a list of deterministic values that represent one or more elements of the difference, and mapping the list of deterministic values to the identification of the resource and the identification of the first computing process.

4. The method of claim 1, further comprising receiving a third resource modification request from the first computing process, wherein the third resource modification request comprises equivalent modifications as the first resource modification request.

5. The method of claim 1, further comprising;
   determining a time period between the first resource modification request and the second resource modification request; and
   triggering notifying the managing process responsive to the time period being less than a predetermined threshold.

6. The method of claim 1, wherein the managing process implements at least one of a node manager or a cluster manager.

7. The method of claim 1, wherein the resource modification record comprises an attribute-value pair.

8. A system comprising:
   a memory; and
   a processing device, operatively coupled to the memory, to:
   receive, by a processing device, from a first computing process running on a computing platform, a first resource modification request to modify a resource of the computing platform;
   store, in the memory, a resource modification record comprising an identification of the first computing process, an identification of the resource, a current state of the resource, and a modified state of the resource;
   receive, from a second computing process running on the computing platform, a second resource modification request to modify the resource;
   determine, using the resource modification record, whether the second resource modification request conflicts with the first resource modification request; and
   responsive to determining that the second resource modification request conflicts with the first resource modification request, notify a managing process of the computing platform of a resource modification conflict with respect to the resource.

9. The system of claim 8, wherein the first computing process implements an operator pattern service.

10. The system of claim 8, further comprising the processing device configured to:
    generate resource modification record by determining a difference between the current state of the resource and the modified state of the resource, converting the difference to a list of deterministic values that represent one or more elements of the difference, and mapping the list of deterministic values to the identification of the resource and the identification of the first computing process.

11. The system of claim 8, further comprising the processing device configured to:
receive a third resource modification request from the first computing process, wherein the third resource modification request comprises equivalent modifications as the first resource modification request.

12. The system of claim 8, further comprising the processing device configured to:
determine a time period between the first resource modification request and the second resource modification request; and
trigger notifying the managing process responsive to the time period being less than a predetermined threshold.

13. The system of claim 8, wherein the managing process implements at least one of a node manager or a cluster manager.

14. The system of claim 8, wherein the resource modification record comprises an attribute-value pair.

15. A non-transitory computer readable medium comprising instructions, which when accessed by a processing device, cause the processing device to:
receive, by a processing device, from a first computing process running on a computing platform, a first resource modification request to modify a resource of the computing platform;
store, in a memory, a resource modification record comprising an identification of the first computing process, an identification of the resource, a current state of the resource, and a modified state of the resource;
receive, from a second computing process running on the computing platform, a second resource modification request to modify the resource;
determine, using the resource modification record, whether the second resource modification request conflicts with the first resource modification request; and
responsive to determining that the second resource modification request conflicts with the first resource modification request, notify a managing process of the computing platform of a resource modification conflict with respect to the resource.

16. The non-transitory computer readable medium of claim 15, wherein the first computing process implements an operator pattern service.

17. The non-transitory computer readable medium of claim 15, further comprising the processing device configured to:
generate resource modification record by determining a difference between the current state of the resource and the modified state of the resource, converting the difference to a list of deterministic values that represent one or more elements of the difference, and mapping the list of deterministic values to the identification of the resource and the identification of the first computing process.

18. The non-transitory computer readable medium of claim 15, further comprising the processing device configured to:
receive a third resource modification request from the first computing process, wherein the third resource modification request comprises equivalent modifications as the first resource modification request.

19. The non-transitory computer readable medium of claim 15, further comprising the processing device configured to:
determine a time period between the first resource modification request and the second resource modification request; and
trigger notifying the managing process responsive to the time period being less than a predetermined threshold.

20. The non-transitory computer readable medium of claim 15, wherein the managing process implements at least one of a node manager or a cluster manager.

* * * * *